US012586780B2

(12) United States Patent
Lee et al.

(10) Patent No.: US 12,586,780 B2
(45) Date of Patent: Mar. 24, 2026

(54) CATHODE ACTIVE MATERIAL FOR LITHIUM SECONDARY BATTERY, CATHODE INCLUDING THE SAME AND LITHIUM SECONDARY BATTERY INCLUDING THE SAME

(71) Applicant: SK ON CO., LTD., Seoul (KR)

(72) Inventors: Sang Wook Lee, Daejeon (KR); Young Hoon Do, Daejeon (KR); Young Uk Park, Daejeon (KR); Yong Hyun Cho, Daejeon (KR); Seung Ok Lee, Daejeon (KR); Ji Sun Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 782 days.

(21) Appl. No.: 17/718,946

(22) Filed: Apr. 12, 2022

(65) Prior Publication Data

US 2022/0344642 A1 Oct. 27, 2022

(30) Foreign Application Priority Data

Apr. 13, 2021 (KR) ........................ 10-2021-0047930

(51) Int. Cl.
| | |
|---|---|
| *H01M 4/36* | (2006.01) |
| *H01M 4/02* | (2006.01) |
| *H01M 4/505* | (2010.01) |
| *H01M 4/525* | (2010.01) |
| *H01M 10/0525* | (2010.01) |

(52) U.S. Cl.
CPC .......... *H01M 4/366* (2013.01); *H01M 4/505* (2013.01); *H01M 4/525* (2013.01); *H01M*

*10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2020/0266440 A1* 8/2020 Murakami ............ H01M 4/364

FOREIGN PATENT DOCUMENTS

| EP | 2634846 A1 | 9/2013 |
|---|---|---|
| KR | 10-2015-0014875 A | 2/2015 |
| KR | 10-2016-0031427 A | 3/2016 |
| KR | 10-2020-0029397 A | 3/2020 |
| KR | 10-2207997 B1 | 1/2021 |
| WO | 2021/042986 A1 | 3/2021 |

OTHER PUBLICATIONS

Extended European Search Report for the European Patent Application No. 22168041.6 issued by the European Patent Office on Oct. 11, 2022.

* cited by examiner

*Primary Examiner* — Stewart A Fraser
(74) *Attorney, Agent, or Firm* — IP & T GROUP LLP

(57) ABSTRACT

A cathode active material for a lithium secondary battery according to an embodiment of the present invention includes a lithium metal oxide particle containing nickel, and a coating material formed on at least a portion of a surface of the lithium metal oxide particle. The coating material includes a metalloid element or a metal element. A surface coating level of the cathode active material is 0.3 or more.

9 Claims, 2 Drawing Sheets

CATHODE ACTIVE MATERIAL FOR LITHIUM SECONDARY BATTERY, CATHODE INCLUDING THE SAME AND LITHIUM SECONDARY BATTERY INCLUDING THE SAME

CROSS-REFERENCE TO RELATED APPLICATION

This application claims priority to Korean Patent Application No. 10-2021-0047930 filed on Apr. 13, 2021 in the Korean Intellectual Property Office (KIPO), the entire disclosure of which is incorporated by reference herein.

TECHNICAL FIELD

The present invention relates to a cathode active material for a lithium secondary battery, a cathode including the same and a lithium secondary battery including the same. More particularly, the present invention relates to a cathode active material including a lithium metal oxide and a coating material, and a cathode including the same and a lithium secondary battery including the same.

BACKGROUND

A secondary battery which can be charged and discharged repeatedly has been widely employed as a power source of a mobile electronic device such as a mobile phone, a laptop computer, etc., and an electrical vehicle such as EV, PHEV, HEV, etc.

For example, the secondary battery includes, e.g., a lithium secondary battery, a nickel-cadmium battery, a nickel-hydrogen battery, etc. The lithium secondary battery is being actively developed and applied due to high operational voltage and energy density per unit weight, a high charging rate, a compact dimension, etc.

A cathode of the lithium secondary battery includes a cathode active material capable of a reversible insertion and desorption of lithium ions. For example, the cathode active material may include a lithium metal oxide.

For example, $LiCoO_2$, $LiMnO_2$, $LiNiO_2$, etc., have been widely used as the lithium metal oxide, but researches for replacing the above material in terms of production cost, capacity and life-span properties are being actively conducted.

Accordingly, a ternary (NCM)-based lithium metal oxide containing nickel, cobalt and manganese has been suggested as the cathode active material. However, the NCM-based lithium metal oxide has low stability at high temperatures.

To improve high-temperature stability, a coating material may be introduced on a surface of a lithium metal oxide particle.

SUMMARY

According to an aspect of the present invention, there is provided a cathode active material for a lithium secondary battery having improved high-temperature property and reliability.

According to an aspect of the present invention, there is provided a cathode and a lithium secondary battery including the cathode active material.

A cathode active material for a lithium secondary battery includes a lithium metal oxide particle containing nickel, a coating material formed on at least a portion of a surface of the lithium metal oxide particle, the coating material including a metalloid element or a metal element. A surface coating level expressed as SCL1 in Equation 1 is 0.3 or more.

$$SCL1 = \frac{\text{surface residual ratio of coating material} \times \text{coveragae} \times BET}{1,000} \quad [\text{Equation 1}]$$

In Equation 1, the surface residual ratio of the coating material is a percentage of a weight of the coating material in a dissolved solution when the cathode active material is dissolved in a 2 wt % hydrochloric acid solution for a time corresponding to 8% of a time for completely dissolving the cathode active material relative to a weight of the coating material in a dissolved solution when the cathode active material is completely dissolved in the 2 wt % hydrochloric acid solution. The coverage is a percentage of an area in which a content of the coating material is 0.8 wt % or more based on 100 wt % of total detected elements relative to an area from which Ni is detected based on an energy-dispersive X-ray spectroscopy (EDS) mapping image of a surface of the cathode active material measured by an EDS. The BET is a specific surface area of the cathode active material measured by a gas adsorption/desorption method.

In some embodiments, the SCL1 may be 0.5 or more.

In some embodiments, a content of nickel among all elements excluding lithium and oxygen in the lithium metal oxide particle may be 80 mol % or more.

In some embodiments, the lithium metal oxide particle may be represented by Chemical Formula 1:

$$Li_xNi_aCo_bM_cO_y \quad [\text{Chemical Formula 1}]$$

In Chemical Formula 1, M may include at least one selected from Al, Zr, Ti, Cr, B, Mg, Mn, Ba, Si, Y, W and Sr, $0.9 \leq x \leq 1.2$, $1.9 \leq y \leq 2.1$, $0.8 \leq a \leq 1$, $0 \leq c \leq 0.11$ and $0 \leq c/(a+b) \leq 0.13$.

In some embodiments, the coating material may include at least one selected from Al, Ti, Ba, Zr, Si, B, Mg, P, Sr, W and La.

In some embodiments, the surface residual ratio of the coating material may be from 40% to 90%.

In some embodiments, the coverage may be from 5% to 50%.

In some embodiments, the BET may be from 0.25 $m^2$/g to 1 $m^2$/g.

A cathode for a lithium secondary battery includes a cathode current collector, and a cathode active material layer formed on the cathode electrode current collector. The cathode active material includes a lithium metal oxide particle containing nickel, and a coating material formed on at least a portion of a surface of the lithium metal oxide particle, the coating material including a metalloid element or a metal element. A surface coating level of the cathode active material layer expressed as SCL2 in Equation 2 is 0.7 or more.

$$SCL2 = \frac{\text{surface residual ratio of coating material} \times \text{coveragae} \times BET}{1,000} \quad [\text{Equation 2}]$$

In Equation 2, the surface residual ratio of the coating material is a percentage of a weight of the coating material in a dissolved solution when the cathode active material layer is dissolved in a 2 wt % hydrochloric acid solution for a time corresponding to 8% of a time for completely dissolving the cathode active material layer relative to a weight of the coating material in a dissolved solution when the cathode active material layer is completely dissolved in the 2 wt % hydrochloric acid solution. The coverage is a percentage of an area in which a content of the coating material is 0.8 wt % or more based on 100 wt % of total detected elements relative to an area from which Ni is detected based on an energy-dispersive X-ray spectroscopy (EDS) mapping image of a surface of the cathode active material layer measured by an EDS. The BET is a specific surface area of the cathode active material layer measured by a gas adsorption/desorption method.

In some embodiments, the SCL2 may be 1.0 or more.

In some embodiments, a content of nickel among all elements excluding lithium and oxygen in the lithium metal oxide particle may be 80 mol % or more.

In some embodiments, the coating material may include Al, Ti, Ba, Zr, Si, B, Mg, P, Sr, W and La.

In some embodiments, the surface residual ratio of the coating material may be from 50% to 80%, the coverage may be from 10% to 40%, and the BET may be from 1 m²/g to 2 m²/g.

A lithium secondary battery includes the cathode according to the above-described embodiments, and an anode facing the cathode.

A cathode active material according to exemplary embodiment may include a coating material having a predetermined range of a coating level so that a side reaction with an electrolyte during charging and discharging and storage at a high temperature of a secondary battery may be prevented and degradation of a battery performance may be prevented.

A secondary battery according to exemplary embodiments may include the cathode active material to implement improved life-span and storage properties at high-temperature.

DETAILED DESCRIPTION OF THE EMBODIMENTS

Figure 1:
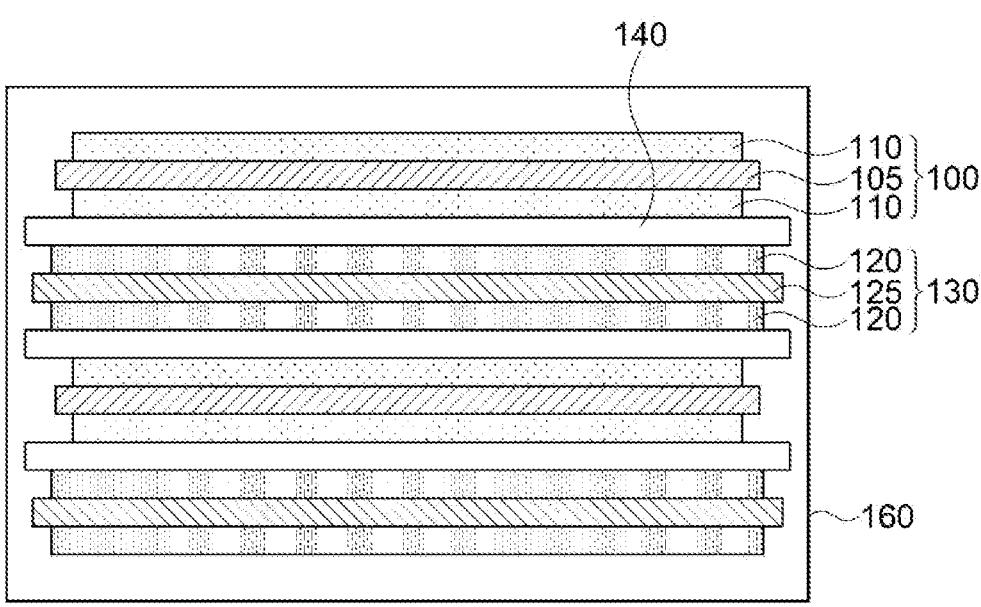
FIGS. 1 and 2 are a schematic cross-sectional view and a schematic plan view, respectively, of a lithium secondary battery in accordance with exemplary embodiments.

As used herein, "a lithium metal oxide" represents an oxide capable of adsorbing and releasing lithium ions, and may refer to a compound including lithium and at least one metal element other than lithium.

As used herein, "including a metalloid element or a metal element" may refer to a case including a metal element, a case including a metalloid element, or a case including both a metal element and a metalloid element.

A cathode active material according to example embodiments may include lithium metal oxide particles including nickel, and a coating material formed on at least a portion of a surface of the lithium metal oxide particle. The coating material may include a metalloid element or a metal element.

In an embodiment, a surface coating level (SCL) defined as Equation 1 below of the cathode active material may be 0.3 or more.

$$SCL1 = \frac{\text{surface residual ratio of coating material} \times \text{coveragae} \times BET}{1,000} \quad \text{[Equation 1]}$$

In Equation 1, the surface residual ratio of the coating material may refer to a percentage of a weight of the coating material in a dissolved solution when the cathode active material is dissolved in a 2 weight percent (wt %) hydrochloric acid solution for a time corresponding to 8% of a time for completely dissolving the cathode active material relative to a weight of the coating material in a dissolved solution when the cathode active material is completely dissolved in the 2 wt % hydrochloric acid solution.

In Equation 1, dimension units of the surface residual ratio of the coating material (%), the coverage (%) and the BET (m²/g) are omitted to be converted into the SCL as a dimensionless number.

For example, the surface residual ratio of the coating material may be represented as Equation 1-1 below.

$$\text{surface remaining ratio of coating material} = C2/C1 \times 100(\%) \quad \text{[Equation 1-1]}$$

In Equation 1-1, C1 represents a content of the coating material in a solution when the cathode active material is completely dissolved in a 2 wt % hydrochloric acid solution. C2 represents a content of the coating material in a solution when the cathode active material is dissolved from a surface thereof in a 2 wt % hydrochloric acid solution for a time corresponding to 0.08T. T represents a time for completely dissolving the cathode active material in a 2 wt % hydrochloric acid solution.

In Equation 1, the coverage value may be a percentage of an area in which the coating material is present relative to an area from which Ni is detected based on an energy-dispersive X-ray spectroscopy (EDS) mapping image of the surface of the cathode active material measured by an EDS.

For example, contents (at % or wt %) of elements detected in a specific spot (e.g., a partial region or an entire region) may be confirmed by a quantitative analysis using the EDS. Accordingly, a content of a target metal element or metalloid element may be confirmed based on 100 wt % of total elements detected in the specific spot.

For example, the coverage value may be measured based on elements detected within a thickness of 1 μm from the surface of the cathode active material.

In some embodiments, the "region in which the coating material is present" may indicate a region in which a content of the coating material is 0.8 wt % or more based on 100 wt % of the total detected elements. For example, the "region in which the content of the coating material is 0.8 wt % or more" may indicate a region in which a peak of the coating material is three times or more a background noise peak in the EDS spectrum.

For example, when 0.8 wt % or more of the coating material is detected based on 100 wt % of the total detected elements or when a ratio of the peak of the coating material relative to the background noise peak in the EDS spectrum is 3 or more, the coating material may be regarded as being present in the region.

For example, the coverage value may be measured as follows. The cathode active material is attached to a carbon tape to prepare a sample, and the EDS mapping image of a surface of the sample (cathode active material) may be measured using a scanning electron microscope (SEM) and the EDS.

For example, the EDS mapping image may be quantified for each point to store an image of a region from which a target element is detected. An image of a region from which nickel is detected may be stored, and an area of the region may be calculated and expressed as A1. Further, an image of a region in which 0.8 wt % or more of the coating material is detected based on 100 wt % of the total elements is stored and an area of the corresponding region may be calculated and expressed as A2. The coverage value may be calculated as A2/A1×100(%).

In Equation 1, the BET value may indicate a specific surface area of the cathode active material measured by a gas adsorption/desorption method using a BET measuring device.

The cathode active material according to exemplary embodiments may include a uniform coating material on the surface of the lithium metal oxide. Accordingly, the side reaction with the electrolyte may be reduced during charge and discharge of the secondary battery and storage at high temperature, and deterioration of a battery performance may be prevented. Thus, the lithium secondary battery including the cathode active material according to exemplary embodiments may have improved high-temperature life-span and storage properties.

In an embodiment, the SCL1 value of the cathode active material may be 0.5 or more, preferably 0.6 or more, more preferably 0.65 or more. In this case, the secondary battery having improved high-temperature life-span and storage properties may be achieved more effectively.

The SCL1 value of the cathode active material may be adjusted in consideration of, e.g., a capacity efficiency of the secondary battery. For example, the SCL1 value of the cathode active material may be adjusted to be 3 or less, or 2 or less.

In an embodiment, the surface residual ratio of the coating material of the cathode active material may be 40% or more. In this case, the coating material may be densely distributed on the particle surface without being diffused into an inside of the lithium metal oxide particle. Accordingly, the side reaction between the lithium metal oxide particles and the electrolyte may be further reduced so that high-temperature life-span and storage properties of the secondary battery may be further enhanced.

In one embodiment, the coating surface residual ratio value may be 90% or less, preferably 80% or less in consideration of an internal doping efficiency of the coating material.

In an embodiment, the coverage value of the cathode active material may be 50% or less. In this case, the coating material may be evenly distributed on the surface of the lithium metal oxide particle. Accordingly, the side reaction between the lithium metal oxide particles and the electrolyte may be further reduced so that high-temperature life-span and storage properties of the secondary battery may be further enhanced.

In an embodiment, the coverage value may be adjusted to be 5% or more in consideration of a coating efficiency, preferably 10% or more.

In an embodiment, the BET value of the cathode active material may be 1 or less, preferably 0.7 or less. In this case, the side reaction between the lithium metal oxide particles and the electrolyte may be further reduced.

In some embodiments, the BET value of the cathode active material may be 0.25 $m^2$/g or more.

In one embodiment, in the lithium metal oxide particles, a content of nickel among all elements excluding lithium and oxygen may be 80 mol % or more, preferably 85 mol % or more. In this case, the secondary battery having high capacity may be achieved.

In an embodiment, the lithium metal oxide particle may be represented by Chemical Formula 1 below.

$$Li_xNi_aCo_bM_cO_y \qquad \text{[Chemical Formula 1]}$$

In Chemical Formula 1, M may include at least one of Al, Zr, Ti, Cr, B, Mg, Mn, Ba, Si, Y, W, and Sr. In Chemical Formula 1, $0.9 \leq x \leq 1.2$, $1.9 \leq y \leq 2.1$, $0.5 \leq a \leq 1$, $0.9 \leq a+b+c \leq 1.1$.

In some embodiments, $0.8 \leq a \leq 1$, $0 \leq c \leq 0.11$ and $0 \leq c/(a+b) \leq 0.13$), preferably $0.85 \leq a \leq 1$.

In some embodiments, the lithium metal oxide particle may have a structure of secondary particles in which primary particles are aggregated.

In some embodiments, the lithium metal oxide particle may have a single particle or monolith structure.

In an embodiment, a particle size ($D_{50}$) of the lithium metal oxide particles may be in a range from 3 μm to 20 μm. For example, the particle size ($D_{50}$) may be defined as a particle size at a point of 50% in a cumulative volumetric distribution. For example, the particle size ($D_{50}$) may be measured by a laser diffraction method using a laser diffraction particle size measuring apparatus (e.g., Microtrac, MT 3000).

In an embodiment, the coating material may include at least one of Al, Ti, Ba, Zr, Si, B, Mg, P, Sr, W and La.

In some embodiments, the coating material may include Al.

A cathode for a secondary battery according to exemplary embodiments include a cathode current collector, and a cathode active material layer formed on the cathode current collector.

In an embodiment, the cathode may include the above-described cathode active material.

In an embodiment, a surface coating level (SCL2) defined as Equation 2 below of the cathode active material layer may be 0.7 or more. In the above range, the secondary battery having improved high-temperature life-span and storage properties may be more effectively achieved.

$$SCL2 = \frac{\text{surface residual ratio of coating material} \times \text{coveragae} \times BET}{1,000} \qquad \text{[Equation 2]}$$

In Equation 2, the surface residual ratio of the coating material may refer to a percentage of a weight of the coating material in a dissolved solution when the cathode active material layer is dissolved in a 2 wt % hydrochloric acid solution for a time corresponding to 8% of a time for completely dissolving the cathode active material layer relative to a weight of the coating material in a dissolved solution when the cathode active material layer is completely dissolved in the 2 wt % hydrochloric acid solution.

In Equation 2, the coverage value may refer to a percentage of an area in which a content of the coating material is 0.8 wt % or more based on 100 wt % of total detected elements relative to an area from which Ni is detected based on an energy-dispersive X-ray spectroscopy (EDS) mapping image of the surface of the cathode active material layer measured by an EDS.

In Equation 2, the BET value may indicate a specific surface area of the cathode active material layer measured by a gas adsorption/desorption method using a BET measuring device.

In an embodiment, the SCL2 value of the cathode active material layer may be 0.8 or more, preferably 1.0 or more. In this case, the secondary battery having improved high-temperature life-span and storage properties may be achieved more effectively.

The SCL2 value of the cathode active material layer may be adjusted in consideration of, e.g., a capacity efficiency of the secondary battery. For example, the SCL2 value of the cathode active material layer may be adjusted to be 4 or less, or 3 or less.

According to exemplary embodiments, a lithium secondary battery including the above-described cathode active material is provided.

Figure 2:
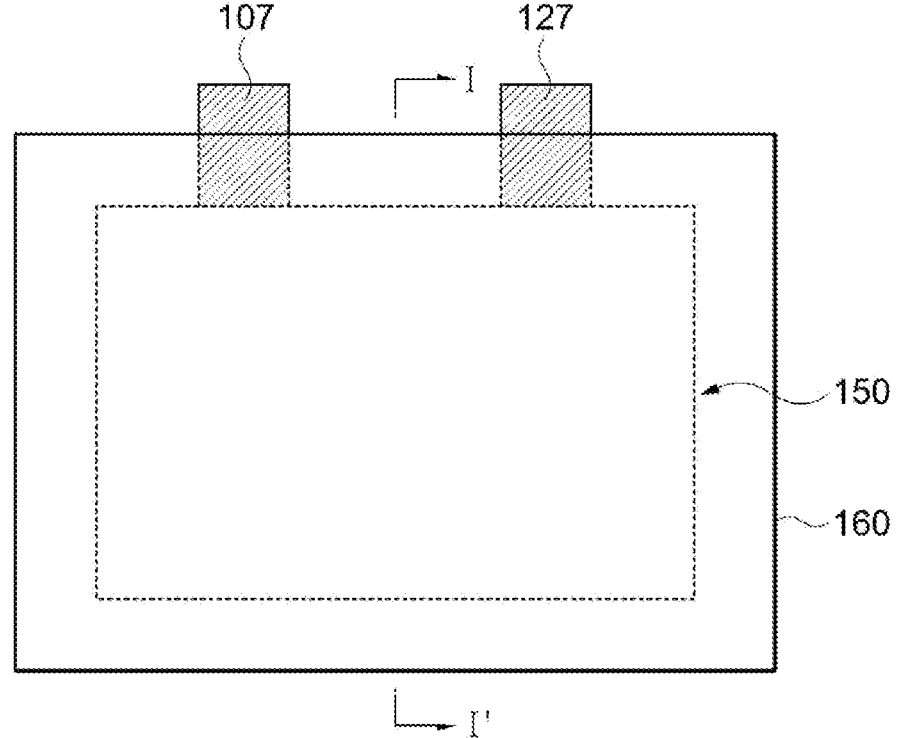

FIGS. 1 and 2 are a schematic cross-sectional view and a schematic plan view, respectively, of a lithium secondary battery in accordance with exemplary embodiments.

Referring to FIG. 1, a lithium secondary battery may include a cathode 100 and an anode 130 facing the cathode 100.

The cathode 100 may include a cathode current collector 105 and a cathode active material layer 110 formed on the cathode current collector 105.

For example, a cathode slurry is prepared by mixing and stirring the cathode active material according to exemplary embodiments as described above, a cathode binder, a conductive material, a dispersive agent, etc. The cathode slurry may be coated on the cathode current collector 105, dried and pressed to form the cathode 100.

The cathode current collector 105 may, e.g., include stainless-steel, nickel, aluminum, titanium, copper or an alloy thereof. Preferably, aluminum or an alloy thereof may be used.

The cathode binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed on the anode current collector 125.

For example, the anode active material layer 120 may include an anode active material layer, an anode binder and a conductive material.

An anode slurry may be prepared by mixing and stirring the anode active material with the binder, the conductive material, etc., in a solvent. The anode slurry may be coated on the anode current collector 125, dried and pressed to form the anode 130.

The anode current collector 125 may include, e.g., gold, stainless steel, nickel, aluminum, titanium, copper or an alloy thereof, preferably may include copper or a copper alloy.

The anode active material may include a material capable of adsorbing and ejecting lithium ions. For example, a carbon-based material such as a crystalline carbon, an amorphous carbon, a carbon complex or a carbon fiber, a lithium alloy, silicon (Si)-based material, etc.

The amorphous carbon may include a hard carbon, cokes, a mesocarbon microbead (MCMB) fired at a temperature of 1500° C. or less, a mesophase pitch-based carbon fiber (MPCF), etc. The crystalline carbon may include a graphite-based material such as natural graphite, graphitized cokes, graphitized MCMB, graphitized MPCF, etc.

The silicon-based material may include, e.g., Si, SiOx (0<x<2), Si/C, SiO/C or Si-Metal.

The lithium alloy may further include aluminum, zinc, bismuth, cadmium, antimony, silicon, lead, tin, gallium, indium, etc.

The anode binder and the conductive material substantially the same as or similar to those for the cathode may be used. In some embodiments, the anode binder may include an aqueous binder such as styrene-butadiene rubber (SBR), and carboxymethyl cellulose (CMC) may also be used as a thickener.

In an embodiment, a separation layer 140 may be interposed between the cathode 100 and the anode 130.

In some embodiments, an area of the anode 130 (e.g., a contact area with the separation layer 140) may be larger than an area of the cathode 100. Accordingly, lithium ions generated from the cathode 100 may be easily transferred to the anode 130 without being precipitated.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like.

The separation layer 140 may also include a non-woven fabric formed from a glass fiber with a high melting point, a polyethylene terephthalate fiber, or the like.

An electrode cell may be defined by the cathode 100, the anode 130 and the separation layer 140, and a plurality of the electrode cells may be stacked to form an electrode assembly 150. For example, the electrode assembly 150 may be formed by winding, laminating or zigzag-folding (z-folding) of the separation layer 140.

Referring to FIG. 2, the lithium secondary battery according to exemplary embodiments may include a cathode lead 107 being connected to the cathode 100 and protruding to an outside of a case 160, and an anode lead 127 being connected to the anode 130 and protruding to the outside of the case 160.

For example, the cathode 100 and the cathode lead 107 may be electrically connected to each other, and the anode 130 and the anode lead 127 may be electrically connected to each other.

For example, the cathode lead 107 may be electrically connected to the cathode current collector 105. The anode lead 127 may be electrically connected to the anode current collector 125.

For example, the cathode current collector 105 may include a protrusion (a cathode tab, not illustrated) at one side thereof. The cathode active material layer 110 may not be formed on the cathode tab. The cathode tab may be integral with the cathode current collector 105 or may be connected by, e.g., a welding. The cathode current collector 105 and the cathode lead 107 may be electrically connected via the cathode tab.

The anode current collector 125 may include a protrusion (an anode tab, not illustrated) at one side thereof. The anode active material layer 120 may not be formed on the anode tab. The anode tab may be integral with the anode current collector 125 or may be connected by, e.g., a welding. The anode current collector 125 and the anode lead 127 may be electrically connected via the anode tab.

In an embodiment, the electrode assembly 150 may include a plurality of cathodes and a plurality of anodes. For example, a plurality of cathodes and anodes may be alternately stacked on each other, and the separation layer may be interposed between the cathode and the anode.

Accordingly, the lithium secondary battery according to exemplary embodiments of the present invention may include a plurality of cathode tabs and a plurality of anode tabs protruding from each of the plurality of cathodes and the plurality of anodes.

In an embodiment, the cathode tabs (or anode tabs) may be laminated, compressed and welded to form a cathode tab stack (or anode tab stack). The cathode tab stack may be electrically connected to the cathode lead 107. The anode tab stack may be electrically connected to the anode lead 127.

The electrode assembly may be accommodated together with the electrolyte in the case 160 to form the lithium secondary battery.

The electrolyte may include, e.g., a lithium salt, and the lithium salt may be accommodated in the case 160 in a non-aqueous electrolyte state together with an organic solvent.

The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc. In some embodiments, the lithium slat may include at least one of $LiBF_4$ and $LiPF_6$.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

The lithium secondary battery may be manufactured in, e.g., a cylindrical shape, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Cathode Active Material

Lithium metal oxide particles having a composition of $LiNi_{0.8}Co_{0.1}Mn_{0.1}O_2$ were prepared.

After mixing the lithium metal oxide particles and $Al_2O_3$, a heat treatment was performed in a temperature ranging from 300° C. to 400° C. to prepare Al-coated lithium metal oxide particles.

The mixing amount of $Al_2O_3$ was 1,000 ppm based on a weight of the lithium metal oxide particles.

(2) Preparation of Lithium Secondary Battery

The Al-coated lithium metal oxide particles as a cathode active material, carbon black and PVdF were mixed in a weight ratio of 92:5:3, and NMP was used as a dispersion medium to prepare a cathode slurry.

The cathode slurry was uniformly coated on an aluminum foil (thickness: 15 μm) having a protrusion (cathode tab) at one side thereof, dried and pressed to prepare a cathode.

An anode active material including artificial graphite and natural graphite in a mixing weight ratio of 7:3, styrene-butadiene rubber (SBR) and carboxymethyl cellulose (CMC) were mixed in a weight ratio of 97:1:2, and water was used as a dispersion medium to prepare an anode slurry.

The anode was prepared by coating, drying and pressing the anode slurry on a copper foil (thickness: 15 μm) having a protrusion (anode tab) on one side.

A polyethylene separator (thickness: 20 μm) was interposed between the cathode and the anode to form an electrode assembly. A cathode lead and an anode lead were welded and connected to the cathode tab and the anode tab, respectively.

The electrode assembly was accommodated in a pouch (case) so that portions of the cathode lead and the anode lead were exposed to an outside, and three sides except for an electrolyte injection side were sealed. An electrolyte was injected, the electrolyte injection side was also sealed, and then an impregnation was performed for 12 hours to prepare a lithium secondary battery sample.

$1M$ $LiPF_6$ solution (using a mixed solvent of EC/EMC/DEC in a volume ratio of 25:30:45) in which FEC 1 wt % (fluoroethylene carbonate), VC (vinylethylene carbonate) 0.3 wt %, $LiPO_2F_2$ (lithium difluorophosphate) 1.0 wt %, PS (1,3-Propane sultone) 0.5 wt % and PRS (Prop-1-ene-1,3-sultone) 0.5 wt % were added and mixed was used as the electrolyte.

Example 2

A lithium secondary battery sample was prepared by the same method as that in Example 1 except that a content of $Al_2O_3$ was 800 ppm in the preparation of the cathode active material.

Example 3

A lithium secondary battery sample was prepared by the same method as that in Example 1, except that lithium metal oxide particles having a composition of $LiNi_{0.88}Co_{0.09}Mn_{0.03}O_2$ were used and a content of $Al_2O_3$ was 800 ppm in the preparation of the cathode active material.

Example 4

A lithium secondary battery sample was prepared by the same method as that in Example 1, except that a content of $Al_2O_3$ was 2,500 ppm and a heat treatment was performed at a temperature ranging from 650° C. to 750° C. in the preparation of the cathode active material.

Comparative Example

A lithium secondary battery sample was prepared by the same method as that in Example 1, except that a content of $Al_2O_3$ was 1,500 ppm and a heat treatment was performed at a temperature ranging from 650° C. to 750° C. in the preparation of the cathode active material.

Experimental Example 1: Evaluation of Surface Coating Level of the Cathode Active Material The surface coating level of the cathode active material (SCL1) was calculated from the Equation 1.

$$SCL1 = \frac{\text{surface residual ratio of coating material} \times \text{coveragae} \times BET}{1,000} \quad \text{[Equation 1]}$$

The coating material surface residual ratio, the coverage and the BET specific surface area values were calculated as follows:

(1) Surface Residual Ration of Coating Material (Al)

A total Al content (C1) and a surface Al content (C2) were measured as described below, and the Al surface residual ratio was calculated by the Equation 1-1.

$$\text{surface remaining ratio of coating material} = C2/C1 \times 100(\%) \quad \text{[Equation 1-1]}$$

1) Analysis of Total Al Content 0.02 g of the cathode active material of Examples and Comparative Example and 0.1 ml of hydrogen peroxide were added to 2 ml of an aqueous hydrochloric acid solution (2 wt %), and completely dissolved for 1 hour.

After 10 times dilution of the solution, a total Al element content C1 contained in the entire solution was measured using an Inductively Coupled Plasma-Optical Emission Spectroscopy (ICP; Optima 7300DV, PerkinElmer).

2) Analysis of Surface Al Content

A time for dissolving the cathode active material was changed to 0.08 hour. After the completion of the 0.08 hour, the cathode active material was removed using a syringe filter, and the Al element content C2 in the solution was measured using the ICP.

(2) Coverage

The cathode active materials of Examples and Comparative Example were attached to a carbon tape to prepare samples.

The coverage value of the samples were measured using a scanning electron microscope (SEM) and an energy dispersive X-ray spectrometer (EDS).

SEM measurement conditions are as follows.

Accelerating Voltage: 10 kV

Beam Current: 1.6 nA

Detector: ETD (Everhart-Thornley Detector), FlatQuad EDS (FQ-EDS)

Use case: Standard

A magnification of the EDS was adjusted to ×1,000, and an EDS mapping was performed on the samples for 900 seconds.

Each point of the EDS mapping image was quantified and detected elements were expressed as wt %.

Figure 3:
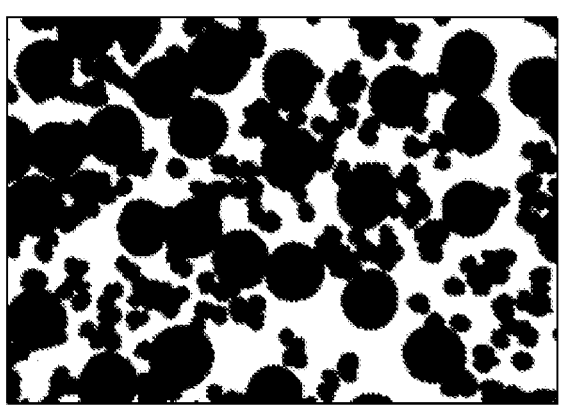
FIG. 3 is an image showing a region from which Ni was detected in a sample of Example 1 when measured and analyzed using an energy-dispersive X-ray spectroscopy (EDS).

The EDS mapping image of a region in which nickel was detected (FIG. 3) was stored, and then the corresponding area A1 was calculated.

Figure 4:
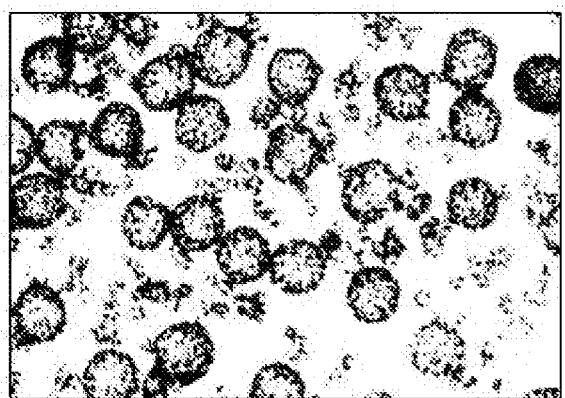
FIG. 4 is an image showing a region from which 0.8 wt % or more of Al was detected in a sample of Example 1 when measured and analyzed using energy-dispersive X-ray spectroscopy (EDS).

The EDS mapping image of a region in which Al was 0.8 wt % or more relative to total detected elements (FIG. 4) was stored, and then the corresponding area A2 was calculated. The coverage was calculated by an equation below.

$$\text{Coverage} = A2/A1 \times 100(\%)$$

(3) BET Surface Area

The BET value was measured according to a gas adsorption/desorption method using a BET measuring device (Micrometrics, ASAP2420).

Experimental Example 2: Evaluation of High Temperature Life-Span Property

A charge/discharge cycle including charging under conditions of 1 C, 4.2V and 0.1 C cut-off at high temperature (45° C.), leaving for 10 minutes, discharging under conditions of 1 C and 2.5V cut-off, and leaving for 10 minutes was repeated 500 times for secondary batteries of Examples and Comparative Example.

High-temperature life-span property was evaluated as a percentage of a discharge capacity at the 500th cycle relative to a discharge capacity of the first cycle.

Experimental Example 3: Evaluation of High-Temperature Storage Property (Gas Generation)

The lithium secondary batteries of Examples were 100% SoC (State of Charge) charged (4.25V 0.05 C Cut-off), and the lithium secondary batteries of Comparative Example were 100% SoC charged (4.20V 0.05 C Cut-off), and then stores in a chamber of 60° C.

After storage for 4 weeks, the lithium secondary batteries was removed from the chamber, and gas generation was analyzed using a gas chromatography.

Experimental Example 4: Evaluation of Surface Coating Level for Cathode Active Material Layer After evaluation of Experimental Example 2, the lithium secondary batteries of Examples and Comparative Example were disassembled to separate the cathodes.

SCL2 values of the cathodes were measured according to the above-described Equation 2.

$$SCL2 = \frac{\text{surface residual ratio of coating material} \times \text{coveragae} \times BET}{1,000} \quad \text{[Equation 2]}$$

To obtain the surface residual ratio of coating material, the cathodes were immersed in NMP to separate the cathode active material layer, and the ICP analysis was performed as described in Experimental Example 1.

The coverage values were also calculated as described in Experimental Example 1.

To obtain the BET value, the cathode was cut so that a weight of the cathode excluding a weight of the cathode current collector (i.e., a weight of the cathode active material layer) was from about 1.5 g to 1.7 g to prepare a sample. The BET value was obtained from the sample. An electrode density of the cathodes was about 3.7 g/cc.

The results are shown in Tables 1 and 2 below.

TABLE 1

| | Al surface residual ratio (%) | Coverage (%) | BET (m²/g) | SCL1 | high temperature life-span(%) | gas generation (ml/Ah) |
|---|---|---|---|---|---|---|
| Example 1 | 56.0 | 44.9 | 0.58 | 1.46 | 89 | 0.4 |
| Example 2 | 58.5 | 33.8 | 0.61 | 1.21 | 90 | 0.3 |
| Example 3 | 49.2 | 21.5 | 0.63 | 0.67 | 90 | 0.4 |
| Example 4 | 4.7 | 66.9 | 1.61 | 0.51 | 84 | 1.0 |
| Comparative Example 1 | 6.7 | 62.1 | 0.52 | 0.22 | 71 | 2.1 |

Referring to Table 1, in the case of the secondary batteries of Examples using the cathode active material having the SCL1 of 0.3 or more, enhanced capacity retentions were provided in the high-temperature life-span evaluation. Further, gas generation was remarkably suppressed in the high-temperature storage evaluation.

The secondary batteries of Examples 1 to 3 employing the cathode active material having the SCL1 of 0.6 or more provided further improved high-temperature properties.

The secondary battery of Comparative Example using the cathode active material having the SCL1 of less than 0.3 provided degraded life-span and storage properties at high temperature.

TABLE 2

| | Al surface residual ratio (%) | Coverage (%) | BET (m²/g) | SCL2 | high temperature life-span(%) | gas generation (ml/Ah) |
|---|---|---|---|---|---|---|
| Example 1 | 68 | 31.0 | 1.29 | 2.72 | 89 | 0.4 |
| Example 2 | 72 | 23.3 | 1.30 | 2.18 | 90 | 0.3 |
| Example 3 | 56 | 14.1 | 1.35 | 1.07 | 90 | 0.4 |
| Example 4 | 13 | 36.3 | 1.83 | 0.86 | 84 | 1.0 |
| Comparative Example | 16 | 33.8 | 1.28 | 0.69 | 71 | 2.1 |

Referring to Table 2, in the case of the secondary batteries of Examples using the cathode active material layer having the SCL2 of 0.7 or more, enhanced life-span and storage properties at high temperature were provided.

The secondary batteries of Examples 1 to 3 employing the cathode active material layer having the SCL2 of 1 or more provided further improved high-temperature properties.

The secondary battery of Comparative Example using the cathode active material layer having the SCL2 of less than 0.7 provided degraded life-span and storage properties at high temperature.

What is claimed is:

1. A cathode active material for a lithium secondary battery, comprising:

a lithium metal oxide particle containing nickel; and a coating material formed on at least a portion of a surface of the lithium metal oxide particle, the coating material comprising a metalloid element or a metal element, and wherein a surface coating level expressed as SCL1 in Equation 1 is 0.6 to 3.0, and a surface residual ratio of the coating material is from 40% to 90%, wherein the coating material comprises at least one selected from the group consisting of Al, Ti, Ba, Zr, Si, B, Mg, P, Sr, W and La:

$$SCL1 = \frac{\text{residual ratio of coating material} \times \text{surface coverage} \times \text{BET}}{1,000} \quad \text{[Equation 1]}$$

wherein, in Equation 1, the surface residual ratio of the coating material is a percentage equal to a weight of the coating material when the cathode active material is dissolved in a 2 wt % hydrochloric acid solution for a time corresponding to 8% of a time for completely dissolving the cathode active material relative to a weight of the coating material when the cathode active material is completely dissolved in the 2 wt % hydrochloric acid solution, the coverage is a percentage equal to an area in which a content of the coating material is 0.8 wt % or more based on 100 wt % of total detected elements relative to an area from which Ni is detected based on an energy-dispersive X-ray spectroscopy (EDS) mapping image of a surface of the cathode active material measured by an EDS, and the BET is a specific surface area of the cathode active material measured by a gas adsorption/desorption method.

2. The cathode active material for a secondary battery of claim 1, wherein a content of nickel among all elements excluding lithium and oxygen in the lithium metal oxide particle is 80 mol % or more.

3. The cathode active material for a secondary battery of claim 1, wherein the lithium metal oxide particle is represented by Chemical Formula 1:

$$Li_xNi_aCo_bM_cO_y \quad \text{[Chemical Formula 1]}$$

wherein, in Chemical Formula 1, M comprises at least one selected from the group consisting of Al, Zr, Ti, Cr, B, Mg, Mn, Ba, Si, Y, W and Sr, and $0.9 \leq x \leq 1.2$, $1.9 \leq y \leq 2.1$, $0.8 \leq a \leq 1$, $0 \leq c \leq 0.11$ and $0 \leq c/(a+b) \leq 0.13$.

4. The cathode active material of claim 1, wherein the coverage is from 5% to 50%.

5. The cathode active material for a secondary battery of claim 1, wherein the BET is from 0.25 m²/g to 1 m²/g.

6. A cathode for a lithium secondary battery, comprising:
a cathode current collector; and
a cathode active material layer formed on the cathode electrode current collector, wherein the cathode active material layer comprises:
a lithium metal oxide particle containing nickel; and
a coating material formed on at least a portion of a surface of the lithium metal oxide particle, the coating material comprising a metalloid element or a metal element,
wherein a surface coating level of the cathode active material layer expressed as SCL2 in Equation 2 is 1.0 to 4.0, and a surface residual ratio of the coating material is from 50% to 80%,
wherein the coating material comprises at least one selected from the group consisting of Al, Ti, Ba, Zr, Si, B, Mg, P, Sr, W and La:

$$SCL2 = \frac{\text{surface residual ratio of coating material} \times coveragae \times BET}{1{,}000} \quad \text{[Equation 2]}$$

wherein, in Equation 2, the surface residual ratio of the coating material is a percentage equal to a weight of the coating material when the cathode active material layer is dissolved in a 2 wt % hydrochloric acid solution for a time corresponding to 8% of a time for completely dissolving the cathode active material layer relative to a weight of the coating material when the cathode active material layer is completely dissolved in the 2 wt % hydrochloric acid solution,
the coverage is a percentage equal to an area in which a content of the coating material is 0.8 wt % or more based on 100 wt % of total detected elements relative to an area from which Ni is detected based on an energy-dispersive X-ray spectroscopy (EDS) mapping image of a surface of the cathode active material layer measured by an EDS, and
the BET is a specific surface area of the cathode active material layer measured by a gas adsorption/desorption method.

7. The cathode for a secondary battery according to claim 6, wherein a content of nickel among all elements excluding lithium and oxygen in the lithium metal oxide particle is 80 mol % or more.

8. The cathode for a secondary battery of claim 6, wherein the coverage is from 10% to 40%, and
the BET is from 1 m²/g to 2 m²/g.

9. A lithium secondary battery, comprising:
the cathode of claim 6; and
an anode facing the cathode.

\* \* \* \* \*